(12) United States Patent
Miles

(10) Patent No.: US 8,408,807 B2
(45) Date of Patent: Apr. 2, 2013

(54) HYDRAULIC THERMAL COMPENSATION FOR BEARING SYSTEMS

(75) Inventor: Jordan Miles, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 176 days.

(21) Appl. No.: 13/090,017

(22) Filed: Apr. 19, 2011

(65) Prior Publication Data
US 2012/0269473 A1 Oct. 25, 2012

(51) Int. Cl.
*F16C 19/52* (2006.01)
(52) U.S. Cl. .......... 384/517; 384/556; 384/557
(58) Field of Classification Search .......... 384/556, 384/557, 563, 517, 493, 905
See application file for complete search history.

(56) References Cited

U.S. PATENT DOCUMENTS

| 3,307,890 | A | * | 3/1967 | Johansson | 384/517 |
| 3,772,934 | A | | 11/1973 | Warren | |
| 3,943,780 | A | | 3/1976 | Klaue | |
| 4,211,454 | A | * | 7/1980 | Mitchell et al. | 384/517 |
| 4,611,934 | A | * | 9/1986 | Piotrowski et al. | 384/556 |
| 4,626,111 | A | | 12/1986 | Swasey et al. | |
| 4,904,095 | A | * | 2/1990 | Fournier et al. | 384/517 |
| 5,028,152 | A | | 7/1991 | Hill et al. | |
| 6,993,852 | B2 | | 2/2006 | Russell | |

FOREIGN PATENT DOCUMENTS

| DE | 1834811 U | 7/1961 |
| DE | 3810448 A1 | 10/1988 |
| DE | 3916314 A1 | 11/1990 |
| DE | 19520507 A1 | 12/1996 |
| EP | 0210810 A2 | 2/1987 |
| EP | 0692645 A1 | 1/1996 |
| EP | 2050974 A1 | 4/2009 |

* cited by examiner

*Primary Examiner* — Thomas R Hannon
(74) *Attorney, Agent, or Firm* — Lucas & Mercanti, LLP

(57) ABSTRACT

A thermal compensation element that generates an optimal bearing pre-load. The thermal compensation element has a bearing housing with a recess, a bearing outer ring arranged at least partially within the recess, a bearing shaft with a bearing inner ring arranged axially inward of the bearing outer ring, a piston with an outer sealing ring fixed in the recess axially between the bearing housing and the bearing outer ring, and a fluid supply port. The port increases or decreases pressure at the piston via a pressurized medium, allowing adjustable axial forces applied to the end of the hearing shaft by the piston to generate optimal bearing pre-load conditions.

23 Claims, 2 Drawing Sheets

HYDRAULIC THERMAL COMPENSATION FOR BEARING SYSTEMS

FIELD OF INVENTION

The present invention relates generally to bearings and more particularly to a thermal compensation element for bearing systems.

BACKGROUND OF THE INVENTION

Angular contact bearings (e.g. tapered roller bearings and tandem roller bearings) used in automotive transmissions require a device to manage axial preload across operating temperature ranges of the transmission when dissimilar materials are used to support the bearing. Typically, this occurs when a steel bearing is installed in a non-steel housing which has a different thermal expansion coefficient.

Bearings that have a device to account for thermal expansion and contraction are known. However, many known devices can require significant axial preload and have a limited range of expansion and contraction. Moreover, the devices are non-adjustable for real-time conditions. For example, no sensors or controls are present in the devices to dynamically vary pressure of the system. Further, many devices require additional components to store hydraulic pressure.

U.S. Pat. No. 4,626,111, for example, discloses a self-compensating anti-friction bearing clearance device. The device adjusts the internal clearance in a roller bearing to account for thermal expansion and contraction.

Moreover, see for example U.S. Pat. No. 5,028,152, which discloses a bearing that utilizes an elastomeric material to account for thermal expansion and contraction of components for machinery having dissimilar materials used in conjunction with each other. Thermal compensation is provided by inserting an elastomer into a cavity within a machined outer ring of a bearing, bonding an elastomer to a metallic backing, or encapsulating an elastomer within two cups which are snapped into a cavity in an outer ring or an inner ring.

Also, see DE 38 10 448 A1, which discloses a thermal compensating device for a rolling-contact bearing. Here, a back-up ring and a fluid-filled cavity are arranged between a race of a bearing and a housing to compensate for manufacturing tolerances and temperature-dependent and/or material-dependent changes in length of machine elements.

Finally, see for example EP 2 050 974 B1, which discloses a roller bearing apparatus used under a preload. Here, the roller bearing apparatus is prevented from being inclined within a cylinder, thereby preventing leakage of a liquid from a hydraulic pressure chamber of a cylinder.

SUMMARY OF THE INVENTION

The present invention is directed to a thermal compensation element, which can account for high loads and extreme variations of temperature that may occur when the bearing and an associated housing for a transmission, gearbox, axle or the like are comprised of different materials and have different coefficients of thermal expansion. Typically this occurs when a steel bearing ring installed into a non-steel housing which has a different thermal expansion coefficient. Due to the differences of materials and different coefficients of thermal expansion, the rates of expansion and contraction can vary causing a wide variation in bearing preload over a range of temperatures. This variation can lead to an increased preload, an increased frictional torque, and/or a loss of preload, which in turn can lead to a reduction in the life of the bearing, friction, and noise.

The present invention, which is inexpensive and relatively easy to manufacture and assemble, compensates for the potential loading and thermal changes without affecting the bearing's load carrying capacity by maintaining a desired preload force on the bearing through adjustment of a hydraulic pressurized medium. Through the use of a hydraulic method to dynamically control and adjust preload, the thermal compensating element ensures efficiency, friction reduction, and aids in maintaining the life of the bearing. The present invention utilizes several existing known components to build a new system for automobile and industrial power transmission devices, and simplifies the design of mating components.

It should be noted that the present invention can be used in conjunction with various types of bearings including, but not limited to angular contact ball bearings, such as tandem ball bearings and tapered roller bearings.

Broadly, the present invention can be defined as a thermal compensation element, which can comprise a bearing housing having a recess, a bearing outer ring arranged at least partially within the recess, a bearing inner ring arranged radially inward of the bearing outer ring and capable of being mounted at one end of a bearing shaft, a piston having an outer sealing ring fixed in the recess axially between the bearing housing and the bearing outer ring, and a fluid supply port in fluid communication between an outside of the bearing housing and a void formed between the recess of the bearing housing and the piston, the piston displacing axially in response to increasing or decreasing pressure in the void using a pressurized medium, which can be a hydraulic fluid, allowing adjustable axial forces applied to the end of the bearing rings to generate optimal bearing pre-load conditions.

The piston can be a solid disc made from material that has sufficient rigidity to resist axial deflection under load. Alternatively, the piston can be a disc of non-solid configuration that has sufficient rigidity to resist axial deflection under load.

The fluid supply port can open directly in line with the piston.

The thermal compensation element can further include a protrusion that extends from the bearing housing into the recess. The protrusion can be substantially cylindrical and have an outer circumferential surface and an end surface. The outer circumferential surface can contact the inner sealing ring and the end surface can contact the end of the bearing shaft. The protrusion can partially form the fluid supply port and the fluid supply port can open radially into the recess.

The thermal compensation element can further include transmission computer which can control the flow of the pressurized medium into and out of the void.

The thermal compensation element can further include a transmission pump which can generate high pressure for the pressurized medium that can be utilized by the thermal compensation element.

The thermal compensation element can further include a temperature controller, pressure sensors, and temperature sensors. The pressure sensors and the temperature sensors can input data into the temperature controller which can modulate the pressurize medium by monitoring in real-time the pressure sensors and the temperature sensors.

Alternatively, the present invention can be defined as a thermal compensation element, which can comprise a bearing housing having a recess, a bearing outer ring arranged at least partially within the recess, a bearing inner ring arranged radially inward of the bearing outer ring and capable of being mounted at one end of a bearing shaft, a solid, disc-shaped piston having only an outer sealing ring fixed in the recess axially between the bearing housing and the bearing outer ring, and a fluid supply port in fluid communication between an outside of the bearing housing and a void formed between the recess of the bearing housing and the piston, the piston displacing axially in response to increasing or decreasing pressure in the void using a pressurized medium, which can be a hydraulic fluid, allowing adjustable axial forces applied to the end of the bearing rings to generate optimal bearing pre-load conditions.

Here, the piston can be made from material that has sufficient rigidity to resist axial deflection under load. Also, the fluid supply port can open directly in line with the piston.

The thermal compensation element can further include transmission computer which can control the flow of the pressurized medium.

The thermal compensation element can further include a transmission pump which can generate high pressure for the pressurized medium that can be utilized by the thermal compensation element.

Also, the thermal compensation element can further include a temperature controller, pressure sensors, and temperature sensors. The pressure sensors and the temperature sensors can input data into the temperature controller which can modulate the pressurize medium by monitoring in real-time the pressure sensors and the temperature sensors.

The thermal compensation element can further include a transmission pump which can generate high pressure for the pressurized medium that can be utilized by the thermal compensation element.

Further, the present invention can be defined as a thermal compensation element, which can comprise a bearing housing having a recess, a bearing outer ring arranged at least partially within the recess, a bearing inner ring arranged axially inward of the bearing outer ring and capable of being mounted at one end of a bearing shaft, a protrusion extending from the hearing housing into the recess and being in contact with the end of the bearing shaft, a non-solid piston, which has a central opening, having an outer sealing ring fixed in the recess axially between the bearing housing and the bearing outer ring and an inner sealing ring in contact with the protrusion, and a fluid supply port in fluid communication between an outside of the hearing housing and a void formed between the recess of the hearing housing and the piston, the piston displacing axially in response to increasing or decreasing pressure in the void using a pressure medium, which can be a hydraulic fluid, allowing adjustable axial forces applied to the end of the bearing rings to generate optimal hearing pre-load conditions.

Here, the piston can be made from material having sufficient rigidity to resist axial deflection under load. The protrusion can be substantially cylindrical and have an outer circumferential surface and an end surface. The outer circumferential surface can be in contact with the inner sealing ring and the end surface can be in contact with the end of the bearing shaft. The protrusion can partially form the fluid supply port and the fluid supply port can open radially into the recess.

Also, the thermal compensation element can further include transmission computer which can control the flow of the pressurized medium.

The thermal compensation element can further include a transmission pump which can generate high pressure for the pressurized medium that can be utilized by the thermal compensation element.

Finally, the thermal compensation element can further include a temperature controller, pressure sensors, and temperature sensors. The pressure sensors and the temperature sensors can input data into the temperature controller which can modulate the pressurize medium by monitoring in real-time the pressure sensors and the temperature sensors.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
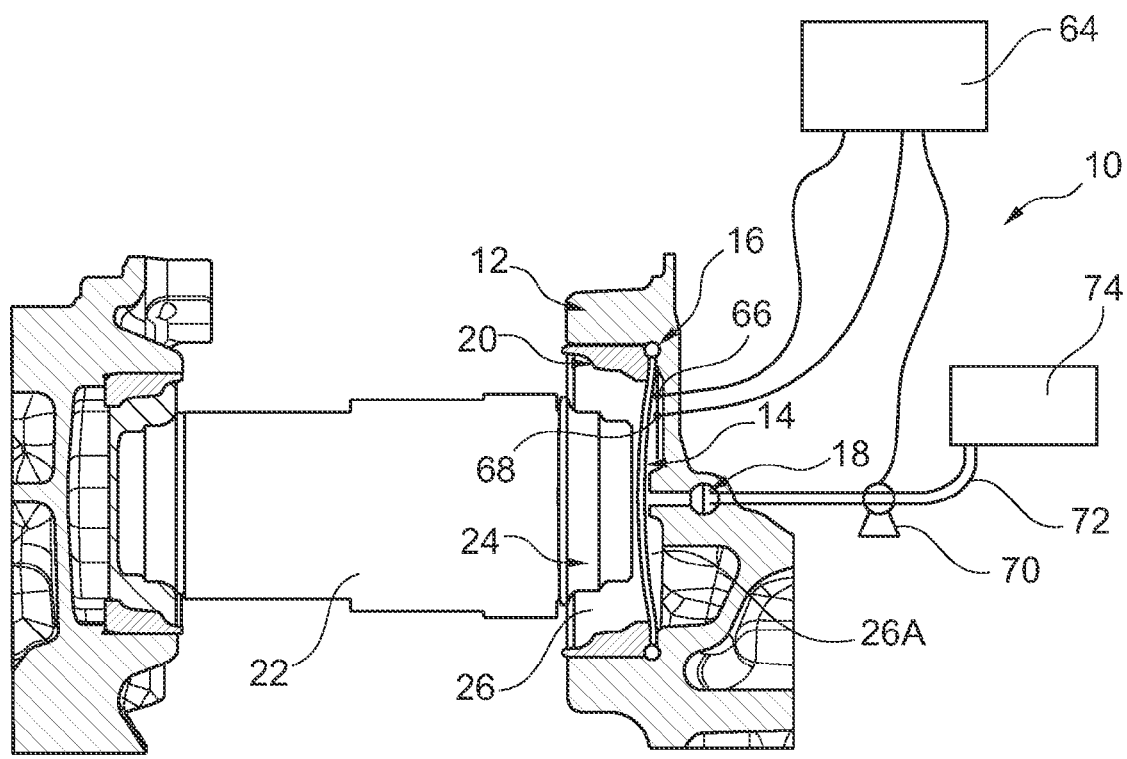
FIG. 1 is a cross-sectional view of a thermal compensation element of the present invention, which has a piston of solid configuration.

FIG. 1 illustrates a first hearing arrangement 10. The hearing arrangement 10 includes a bearing housing 12, a piston 14 with an outer sealing ring 16, a fluid supply port 18, a bearing outer ring 20, and a bearing shaft 22, which has a hearing inner ring 24.

The bearing housing 12 has a recess 26 in which the piston 14, the outer sealing ring 16, the bearing outer ring 20, and the bearing inner ring 24 are located. Rings 20 and 24 may be for any bearing known in the art. For example, rings 20 and 24 may be for a double row ball roller bearing as described in commonly-assigned U.S. Patent Application Publication No. US 2011/0033149 A1, hereby incorporated by reference.

The piston 14 is of solid configuration. The piston 14 is mounted axially in the recess 26 between the bearing housing 12 and the outer and inner bearing rings 20, 24. The outer sealing ring 16 is located near the radial outermost end of the piston 14.

Further, the fluid supply port 18 is located in fluid communication between an outside of the bearing housing 12 and a void 26A formed between the recess 26 of the bearing housing 12 and the piston 14. The fluid supply port 18 supplies a pressure medium, such as a hydraulic fluid, centrally in the void 26A of the bearing housing 12 against the piston 14. The piston 14 in turn is axially displaceable in response to increasing or decreasing pressure by the pressure medium and provides adjustable axial force to the bearing rings 20, 24 to generate optimal pre-load conditions. The axial force applied translates across the bearing rings 20, 24 to the other side of the bearing shaft thereby affecting the bearing at the other end of the shaft 22. Although port 18 is depicted with a central exit, other embodiments with other exit points are possible. For example, port 18 may exit to the recess at a point radially outside of the inner race 24.

Figure 2:
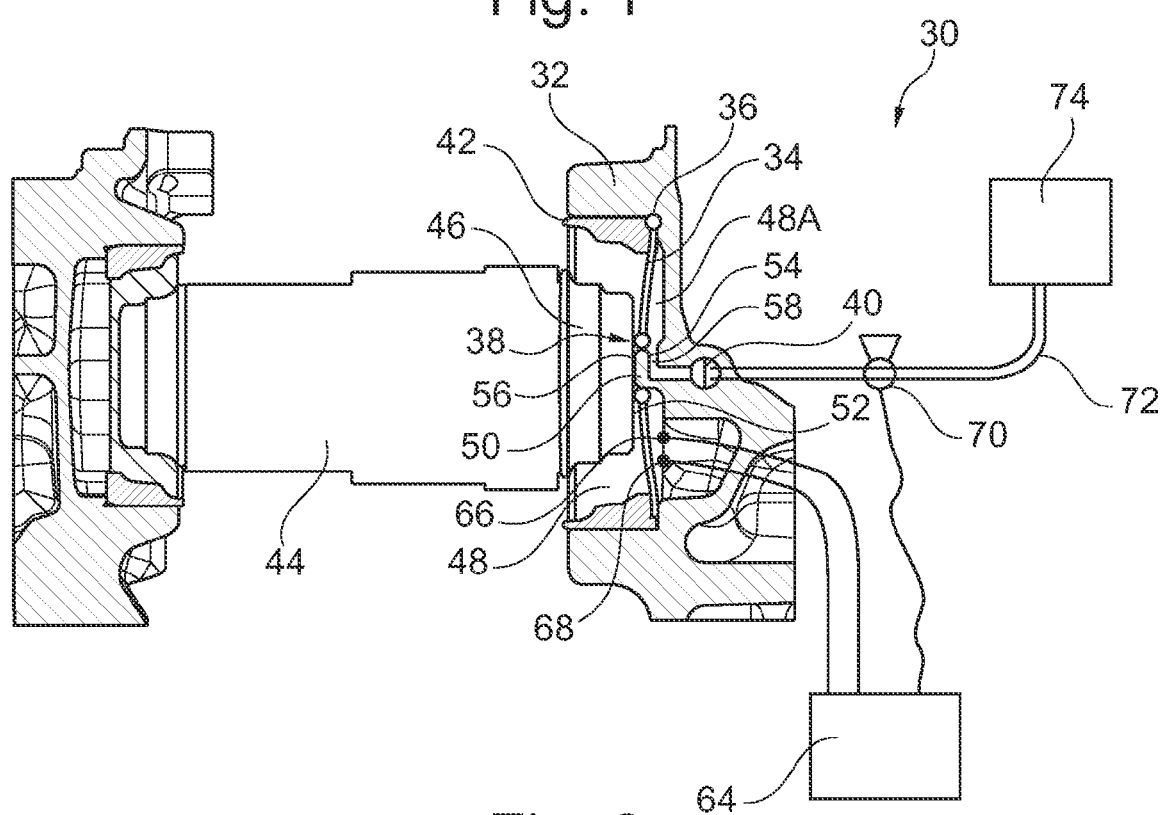
FIG. 2 is a cross-sectional view of a thermal compensation element of the present invention, which has a piston of non-solid configuration.

FIG. 2 illustrates a second bearing arrangement 30. The bearing arrangement 30 has a bearing housing 32, a piston 34 with an outer sealing ring 36 and an inner sealing ring 38, a fluid supply port 40, a bearing outer ring 42, and a bearing shaft 44, which has a bearing inner ring 46.

The bearing housing 32 has a recess 48 in which the piston 34, the piston sealing rings 36, 38, the bearing outer ring 42, and the bearing inner ring 46 are arranged. The bearing housing 32 further has a protrusion 50, which defines the configuration of the fluid supply port 40 that extends centrally into the void 48A between the piston 34 and the bearing housing 32. The protrusion 50 is in contact with an end 52 of the bearing inner ring 46. As shown, the protrusion 50 is substantially cylindrical and has an outer circumferential surface 54 and an end surface 56. However, the protrusion 50 can be of any known configuration that would ensure sealing of the piston 34.

The piston 34 is of non-solid configuration. The piston 34 is mounted axially in the recess 48 between the bearing housing 32 and the bearing outer and inner rings 42, and 46, respectively. The outer sealing ring 36 is located at the radial outermost end of the piston 34. The inner sealing ring 38 is located at the radial innermost end of the piston 34 and is in contact with the protrusion 50 of the recess 48 at the circumferential surface 54 of the protrusion 50.

Figure 3:
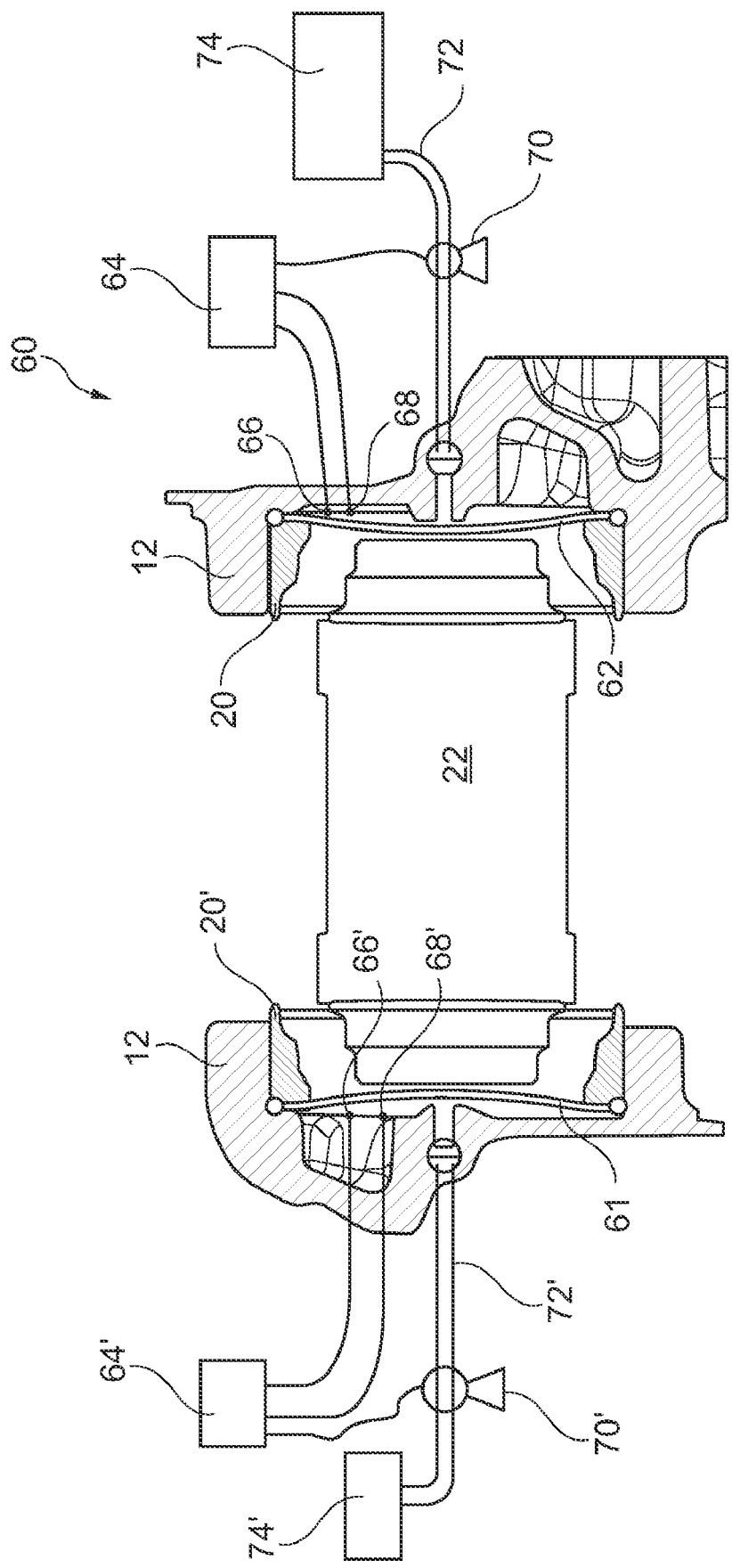
FIG. 3 is a cross-sectional view of a thermal compensation element of the present invention, which has a piston of solid configuration on both ends of a bearing arrangement.

The fluid supply port 40 is arranged in fluid communication between an outside of the bearing housing 32 and the void 48A formed between the recess 48 of the bearing housing 32 and the piston 34. The fluid supply port 40 supplies a pressure medium, such as a hydraulic fluid, in the recess 48 of the bearing housing 32 to activate the piston 34. The piston 34 in turn is axially deflectable in response to increasing or decreasing pressure by the pressure medium and provides adjustable axial force to the bearing rings 42, 46 to generate optimal pre-load conditions. The axial force applied translates across the bearing rings 42, 46 to the other side of the bearing shaft. As shown in FIG. 2, the fluid supply port 40 has an opening 58 exiting through circumferential surface 54 of the protrusion 50 and directed toward the piston 34 near the inner sealing ring 38. FIG. 3 illustrates a third bearing arrangement 60. Here, pistons 61, 62 are arranged on both sides of the arrangement 60. The other components are equivalent to those discussed with regard to FIG. 1.

Existing transmissions have temperature monitoring and electronic solenoids. Thus, a transmission controller 64, 64' monitors real-time pressure and temperature sensors 66, 66' 68, 68' and modulate the pressure medium applied to the fluid supply port 18, 40, allowing adjustable axial forces to be applied to the bearing arrangement 10, 30 by the piston 14, 34, to achieve the optimal preload for the operating conditions. Further, a transmission pump 70, 70' which already generates high pressure fluid, can be utilized by the bearing arrangement 10, 30. The transmission pump 70, 70' is arranged in a fluid supply line 72, 72' between the fluid supply port 18, 40 and a conventional transmission system 74, 74'. The transmission pump 70, 70' also is connected to and controlled by the transmission controller 64, 64'.

Suitably, the piston can be made of metal, such as steel or aluminum, and have a thickness of about 0.4 mm up to about 5 mm, depending on the particular configuration. Other materials, including plastics, fiberglass, or carbon fiber, may be used so long as they can withstand the bearing preload force (up to about 5,000N) and the temperature and fluids present in the operating environment. Suitably, the outer and inner sealing rings are made of nitrile rubber, acrylic rubber, or silicone rubber. However, any other known material could be used as well.

It should be noted that the piston and seal embodiments could be modified such that other means of applying pressure to the bearing rings is possible. For example, an electro-motor could be used to replace the pressure medium.

The present invention has been described with reference to a preferred embodiment. It should be understood that the scope of the present invention is defined by the claims and is not intended to be limited to the specific embodiment disclosed herein.

REFERENCE CHARACTERS

10 First Bearing Arrangement
12 Bearing Housing
14 Piston
16 Outer Sealing Ring
18 Lubrication Supply Port
20 Bearing Outer Ring
22 Bearing Shaft
24 Bearing Inner Ring
26 Recess
26A Void
30 Second Bearing Arrangement
32 Bearing Housing
34 Piston
36 Outer Sealing Ring
38 Inner Sealing Ring
40 Lubrication Supply Port
42 Bearing Outer Ring
44 Bearing Shaft
46 Bearing Inner Ring
48 Recess
48A Void
50 Protrusion
52 End of the Bearing Inner Ring
54 Circumferential Surface
56 End Surface
58 Opening of the Lubrication Supply Port
60 Third Bearing Arrangement
61 Piston
62 Piston
64, 64' Transmission Controller
66, 66' Temperature Sensor
68, 68' Temperature Sensor
70, 70' Transmission Pump
72, 72' Fluid Supply Line
74, 74' Conventional Transmission System

What is claimed:

1. A thermal compensation element, comprising:
    a bearing housing having a recess;
    a bearing outer ring arranged at least partially within the recess;
    a bearing inner ring arranged radially inward of the bearing outer ring and capable of being mounted at one end of a bearing shaft;
    a piston having an outer sealing ring fixed in the recess axially between the bearing housing and the bearing outer ring; and
    a fluid supply port in fluid communication between an outside of the bearing housing and a void formed between the recess of the bearing housing and the piston, the piston displacing axially in response to increasing or decreasing pressure in the void using a pressurized medium, allowing adjustable axial forces applied to one end of each of the bearing rings to generate bearing pre-load conditions.

2. The thermal compensation element of claim 1, wherein the piston is a solid disc.

3. The thermal compensation element of claim 2, wherein the piston is made from material having sufficient rigidity to resist axial deflection under load.

4. The thermal compensation element of claim 2, wherein the fluid supply port opens directly in line with the piston.

5. The thermal compensation element of claim 1, wherein the piston is a disc which has a non-solid configuration and has an inner sealing ring.

6. The thermal compensation element of claim 5, further comprising a protrusion extending centrally from the bearing housing into the recess.

7. The thermal compensation element of claim 6, wherein the protrusion is substantially cylindrical and has an outer circumferential surface and an end surface with the outer circumferential surface contacting the inner sealing ring and the end surface contacting the end of the bearing shaft.

8. The thermal compensation element of claim 7, wherein the protrusion partially forms the fluid supply port and the fluid supply port opens radially into the recess.

9. The thermal compensation element of claim 1, wherein the pressurized medium is hydraulic fluid.

10. The thermal compensation element of claim 1, further comprising a transmission computer which controls flow of the pressurized medium.

11. The thermal compensation element of claim 10, further comprising a transmission pump which generates high pressure for the pressurized medium that is utilized by the thermal compensation element.

12. The thermal compensation element of claim 11, further comprising a temperature controller, pressure sensors, and temperature sensors, wherein the pressure sensors and the temperature sensors input data into the temperature controller which modulates the pressurize medium by monitoring in real-time the pressure sensors and the temperature sensors.

13. A thermal compensation element, comprising:
a bearing housing having a recess;
a bearing outer ring arranged at least partially within the recess;
a bearing inner ring arranged axially inward of the bearing outer ring and capable of being mounted at one end of a bearing shaft;
a solid, disc-shaped piston having only an outer sealing ring fixed in the recess axially between the bearing housing and the bearing outer ring; and
a fluid supply port in fluid communication between an outside of the bearing housing and a void formed between the recess of the bearing housing and the piston, the piston displacing axially in response to increasing or decreasing pressure in the void using a pressurized medium, allowing adjustable axial forces applied to one end of each the bearing rings to generate bearing pre-load conditions.

14. The thermal compensation element of claim 13, further comprising a transmission computer which controls flow of the pressurized medium.

15. The thermal compensation element of claim 14, further comprising a transmission pump which generates high pressure for the pressurized medium that is utilized by the thermal compensation element.

16. The thermal compensation element of claim 15, further comprising a temperature controller, pressure sensors, and temperature sensors, wherein the pressure sensors and the temperature sensors input data into the temperature controller which modulates the pressurize medium by monitoring in real-time the pressure sensors and the temperature sensors.

17. A thermal compensation element, comprising:
a bearing housing having a recess;
a bearing outer ring arranged at least partially within the recess;
a bearing inner ring arranged axially inward of the bearing outer ring and capable of being mounted at one end of a bearing shaft;
a protrusion extending from the bearing housing into the recess and being in contact with the one end of the bearing shaft;
a non-solid piston, which has a central opening, having an outer sealing ring fixed in the recess axially between the bearing housing and the bearing outer ring and an inner sealing ring being in contact with the protrusion; and
a fluid supply port in fluid communication between an outside of the bearing housing and a void formed between the recess of the bearing housing and the piston, the piston displacing axially in response to increasing or decreasing pressure in the void using a pressure medium, allowing adjustable axial forces applied to one end of each of the bearing rings to generate bearing pre-load conditions.

18. The thermal compensation element of claim 17, wherein the piston is made from material having sufficient rigidity to resist axial deflection under load.

19. The thermal compensation element of claim 17, wherein the protrusion is substantially cylindrical and has an outer circumferential surface and an end surface with the outer circumferential surface contacting the inner sealing ring and the end surface contacting the end of the bearing shaft.

20. The thermal compensation element of claim 17, wherein the protrusion partially forms the fluid supply port and the fluid supply port opens radially into the recess.

21. The thermal compensation element of claim 17, further comprising a transmission computer which controls flow of the pressurized medium.

22. The thermal compensation element of claim 21, further comprising a transmission pump which generates high pressure for the pressurized medium that is utilized by the thermal compensation element.

23. The thermal compensation element of claim 22, further comprising a temperature controller, pressure sensors, and temperature sensors, wherein the pressure sensors and the temperature sensors input data into the temperature controller which modulates the pressurized medium by monitoring in real-time the pressure sensors and the temperature sensors.

\* \* \* \* \*